(12) United States Patent  (10) Patent No.: US 8,327,507 B2
Eisinger  (45) Date of Patent: Dec. 11, 2012

(54) WEB ADJUSTER FOR VEHICLE SEAT HARNESS

(75) Inventor: Darren P. Eisinger, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 43 days.

(21) Appl. No.: 12/877,807

(22) Filed: Sep. 8, 2010

(65) Prior Publication Data

US 2012/0054989 A1  Mar. 8, 2012

(51) Int. Cl.
  *A44B 11/06*  (2006.01)
(52) U.S. Cl. ....... 24/170; 24/68 R; 24/69 SB; 24/69 ST; 24/168; 24/191; 24/457
(58) Field of Classification Search ................... 24/68 R, 24/69 SB, 69 ST, 168, 170, 191, 457
  See application file for complete search history.

(56) References Cited

U.S. PATENT DOCUMENTS

| | | | | |
|---|---|---|---|---|
| 939,902 | A * | 11/1909 | Garrison | 24/170 |
| 1,388,623 | A * | 8/1921 | Walker | 24/191 |
| 3,413,691 | A * | 12/1968 | Elsner | 24/170 |
| 4,660,889 | A * | 4/1987 | Anthony et al. | 297/467 |
| D328,239 | S | 7/1992 | Meeker | |
| 5,197,176 | A | 3/1993 | Reese | |
| 5,265,910 | A | 11/1993 | Barr et al. | |
| 5,291,638 | A * | 3/1994 | Huang | 24/170 |
| 5,513,880 | A | 5/1996 | Ohira et al. | |
| 5,733,004 | A | 3/1998 | Celestina-Krevh et al. | |
| 5,870,816 | A * | 2/1999 | McFalls et al. | 29/434 |
| 5,902,016 | A * | 5/1999 | Moran et al. | 297/484 |
| 5,920,963 | A * | 7/1999 | Chou | 24/170 |
| 6,050,640 | A * | 4/2000 | Gibson et al. | 297/250.1 |
| 6,474,691 | B2 | 11/2002 | Izume et al. | |
| 6,631,537 | B1 * | 10/2003 | Huang | 24/193 |
| 6,682,053 | B1 * | 1/2004 | Chou | 254/218 |
| 6,868,585 | B2 * | 3/2005 | Anthony et al. | 24/68 R |
| 6,868,587 | B2 * | 3/2005 | Rard | 24/170 |
| 7,252,342 | B2 | 8/2007 | Patrizi et al. | |
| 7,334,301 | B2 * | 2/2008 | Huang et al. | 24/170 |
| 7,404,239 | B1 * | 7/2008 | Walton et al. | 24/193 |
| 2001/0039696 | A1 * | 11/2001 | Maciejczyk | 24/170 |
| 2003/0019080 | A1 * | 1/2003 | Anthony et al. | 24/68 R |
| 2008/0010786 | A1 * | 1/2008 | Huang | 24/170 |

* cited by examiner

*Primary Examiner* — Robert J Sandy
*Assistant Examiner* — David Upchurch
(74) *Attorney, Agent, or Firm* — Barnes & Thornburg LLP

(57) ABSTRACT

A child-restraint system is adapted for use with a juvenile vehicle seat. The child-restraint system includes a frame configured to be mounted on the juvenile vehicle seat and a web clamp coupled to the frame. The web clamp is configured to clamp a web passing under the web clamp and through a web-receiving channel formed in the frame.

29 Claims, 9 Drawing Sheets

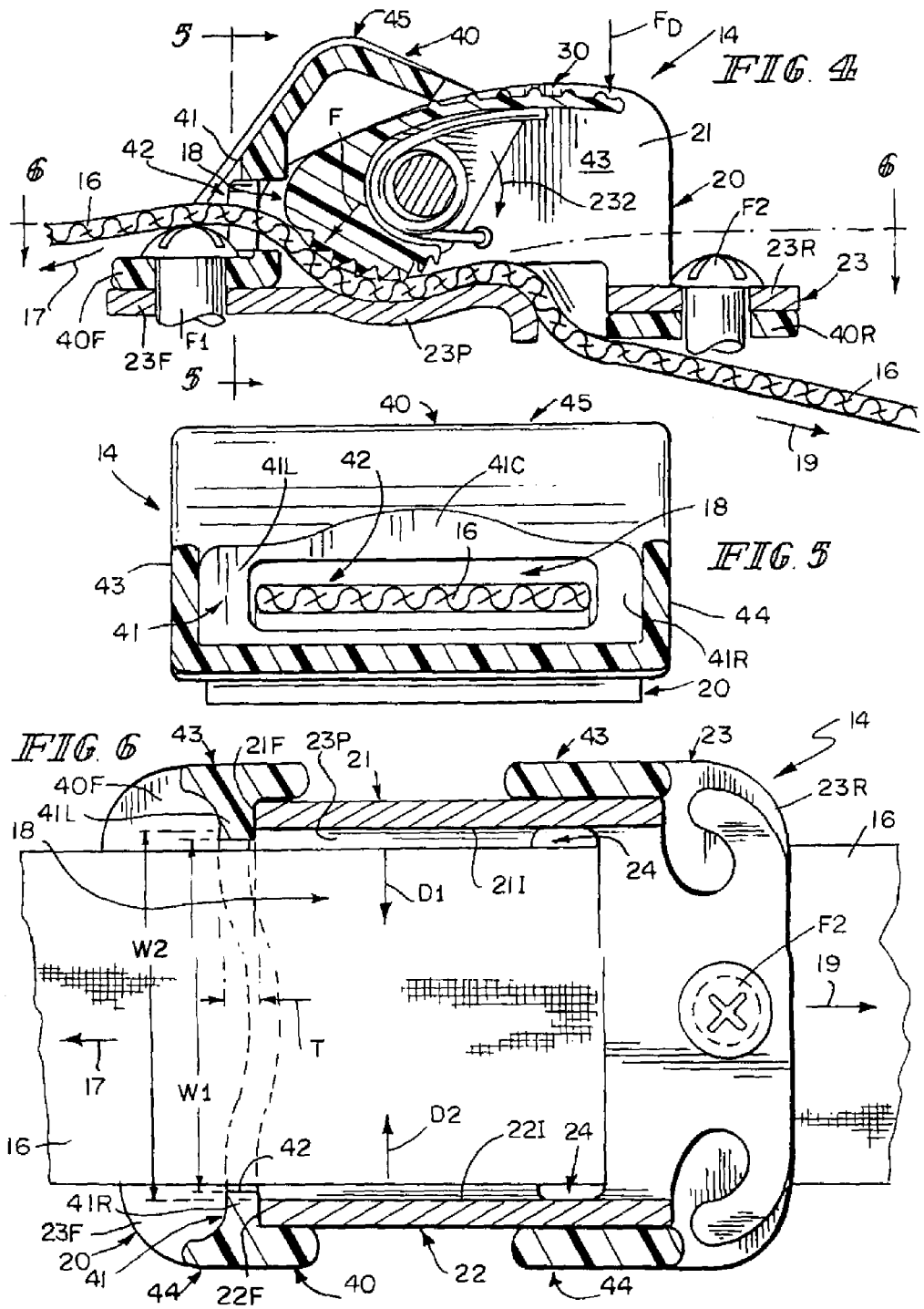

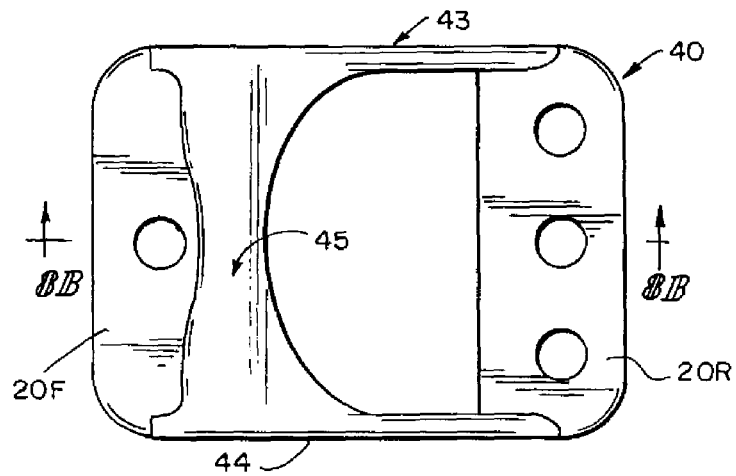
FIG. 7
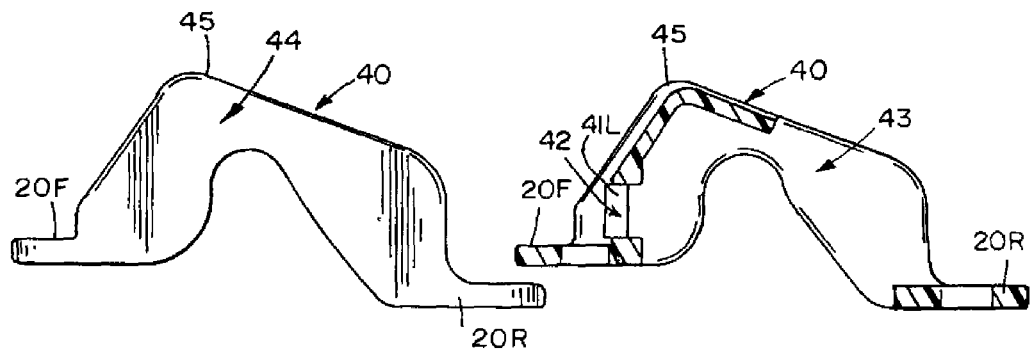
FIG. 8A                FIG. 8B
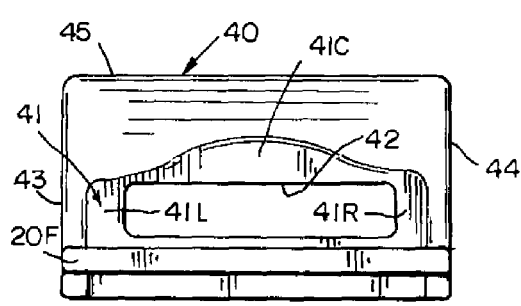    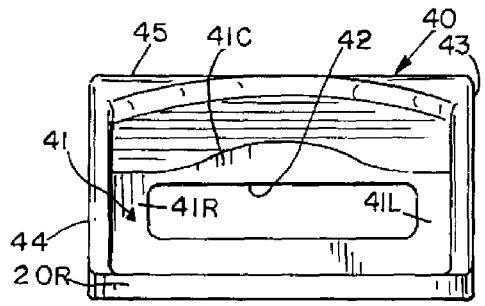
FIG. 9                FIG. 10

WEB ADJUSTER FOR VEHICLE SEAT HARNESS

BACKGROUND

The present disclosure relates to child restraints, and particularly to a harness system for securing a juvenile to a juvenile vehicle seat. More particularly, the present disclosure relates to an adjuster for a web included in the harness.

SUMMARY

A child-restraint system in accordance with the present disclosure comprises a harness and a center front adjuster including a frame adapted to be mounted on a juvenile vehicle seat and a web clamp mounted on the frame. The web clamp is used to clamp a web included in the harness to retain the harness in snug-fit relation to a child seated on the juvenile vehicle seat. A caregiver uses the center front adjuster to tighten and to loosen the harness while the child is seated on the juvenile vehicle seat.

In illustrative embodiments, the center front adjuster further comprises a web guide mounted on the frame to cover a portion of the web clamp. The web guide is formed to provide means for guiding the web through a web channel formed in the frame and away from portions of upright first and second side plates included in the frame so that the position of the web relative to the frame is controlled for that portion of the web passing through the center front adjuster. In illustrative embodiments, the frame is made of a sheet metal material and the web guide is made of a plastics material.

In illustrative embodiments, a method of mounting a web guide onto a companion frame using a web coupled to the web guide and the frame is disclosed. A rear mount flange included in the frame is pushed into an opening formed in the middle of the web guide. A web arranged to pass through a web entrance slot formed in the web guide and a web exit slot formed in the frame is pulled to snap the web guide in place on the frame.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 is an enlarged sectional view taken along line 4-4 of FIG. 1 showing the CFA webbing strip passing through a web entrance slot formed in the web guide and into a web tunnel bounded by the sheet metal frame and the web guide, under the spring-loaded web-gripping pawl, and downwardly out of the web tunnel and through a web exit slot formed in a base plate included in the frame;

FIG. 5 is a sectional view taken along line 5-5 of FIG. 4;

FIG. 6 is a sectional view taken along line 6-6 of FIG. 4 showing that the CFA webbing strip passes through a narrow-width web entrance slot formed in a front wall of the web guide and that first and second entry posts included in the web guide lie on opposite sides of the CFA webbing strip and mate with front edges of the two upright and spaced-apart side plates included in the sheet metal frame to block any engagement of the CFA webbing strip with those metal front edges during movement of the CFA webbing strip through the web-receiving channel formed in the sheet metal frame and the web tunnel defined by the web guide and the sheet metal frame;

FIG. 7 is a top plan view of the web guide shown in FIGS. 2 and 3;

FIG. 8A is a side elevation view of the web guide of FIG. 7;

FIG. 8B is a sectional view taken along lines 8B-8B of FIG. 7;

FIG. 9 is a front elevation view of the web guide of FIG. 7 showing the narrow-width web entrance slot formed in the front wall of the web guide;

FIG. 10 is a rear elevation view of the web guide of FIG. 7;

DETAILED DESCRIPTION

Figure 1:
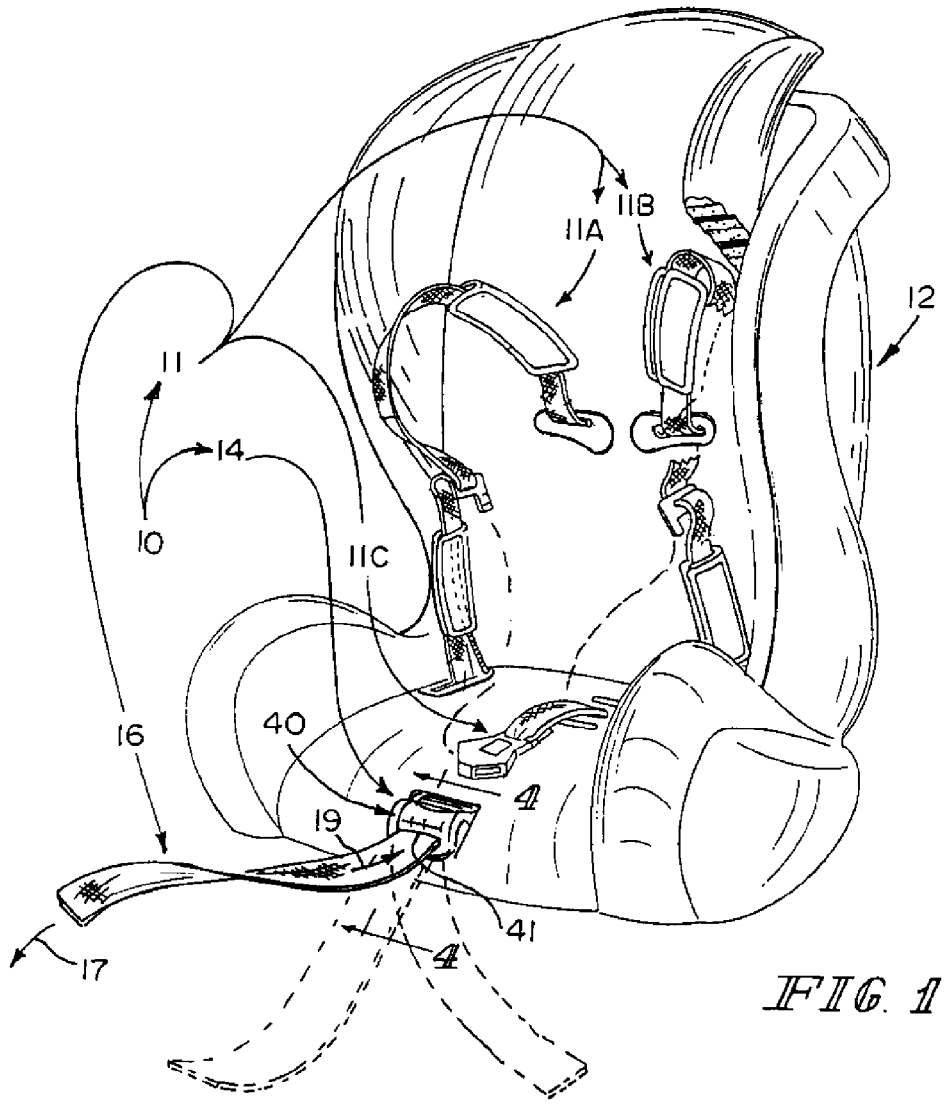
FIG. 1 is a perspective view of a juvenile vehicle seat including a seat bottom, a seat back extending upwardly from the seat bottom, and a child-restraint system comprising a center front adjuster (CFA) in accordance with a first embodiment of the present disclosure and a harness including a strip of CFA webbing extending through the center front adjuster and away from the seat base and terminating at an outer end lying in front of the seat base.

A child restraint 10 including a harness 11 is coupled to a juvenile vehicle seat 12 as shown, for example, in FIG. 1. A center front adjuster 14 in accordance with the present disclosure is included in child restraint 10 and configured to guide movement of a web 16 included in harness 11 as web 16 moves through center front adjuster 14 during adjustment of harness 11 by a caregiver 13 as suggested in FIGS. 4-6 and 11.

Harness 11 can be adjusted to fit snuggly on a child seated in juvenile vehicle seat 12 by pulling web 16 in an outward direction 17 away from juvenile vehicle seat. A web clamp 30 included in center front adjuster 14 acts as a one-way clutch to allow web 16 to be pulled in outward direction 17 during a harness-tightening activity but block movement of web 16 through center front adjuster 14 unless the caregiver 13 first operates web clamp 30 during a harness-loosening activity to release a clamping force applied normally to a portion of web 16 located in center front adjuster 14. Thus, shoulder straps 11A and 11B included in harness 11 can be tightened on a seated child simply by pulling web 16 in outward direction 17 through center front adjuster 14.

Figure 2:
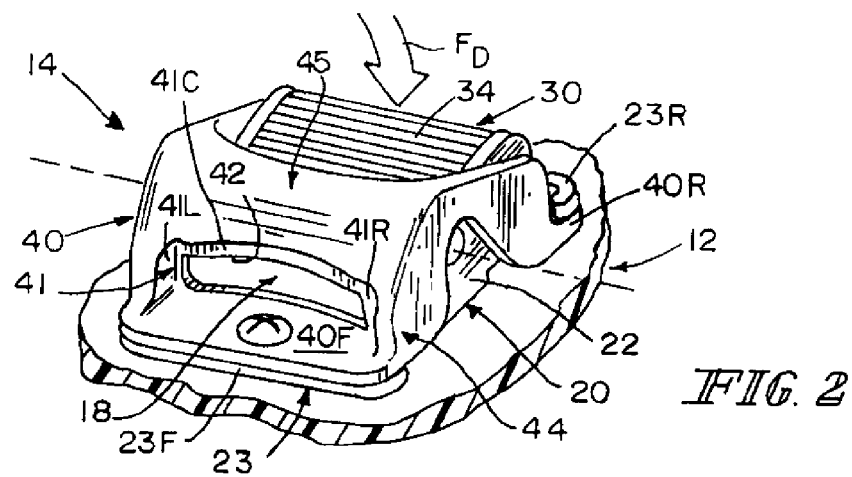
FIG. 2 is an enlarged perspective view of the center front adjuster of FIG. 1 mounted on the underlying seat bottom.
Figure 3:
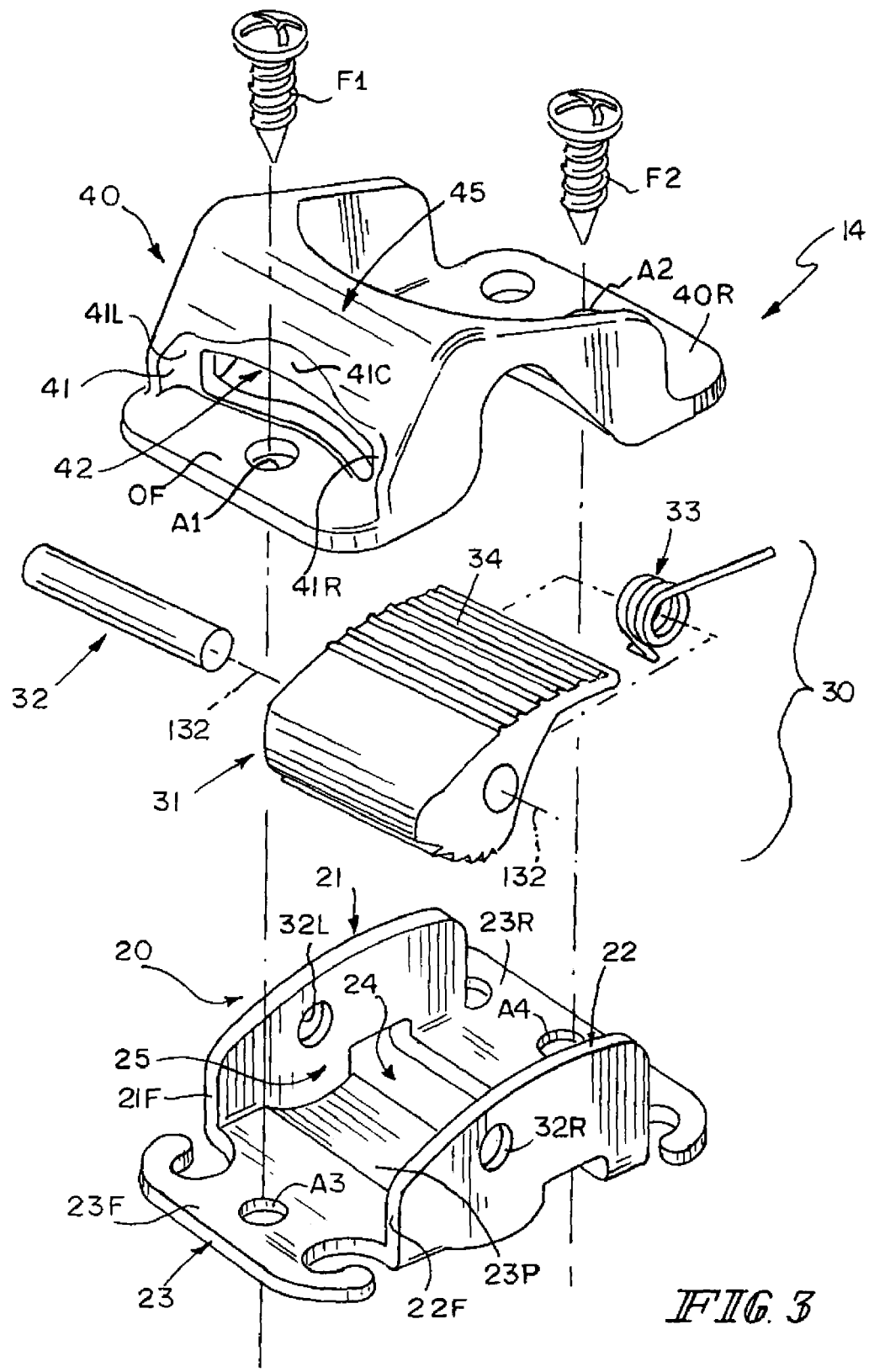
FIG. 3 is an enlarged exploded perspective assembly view of the center front adjuster of FIG. 2 showing (from bottom to top) a sheet metal frame comprising a horizontal base plate formed to include a web exit slot and two upright and spaced-apart side plates arranged to cooperate with the base plate to form a web-receiving channel terminating at the web exit slot, a web-gripping pawl, a pawl axle (on the left), a pawl-return spring (on the right), a web guide, and first and second fasteners for anchoring the frame and the web guide to the seat bottom.
Figure 11:
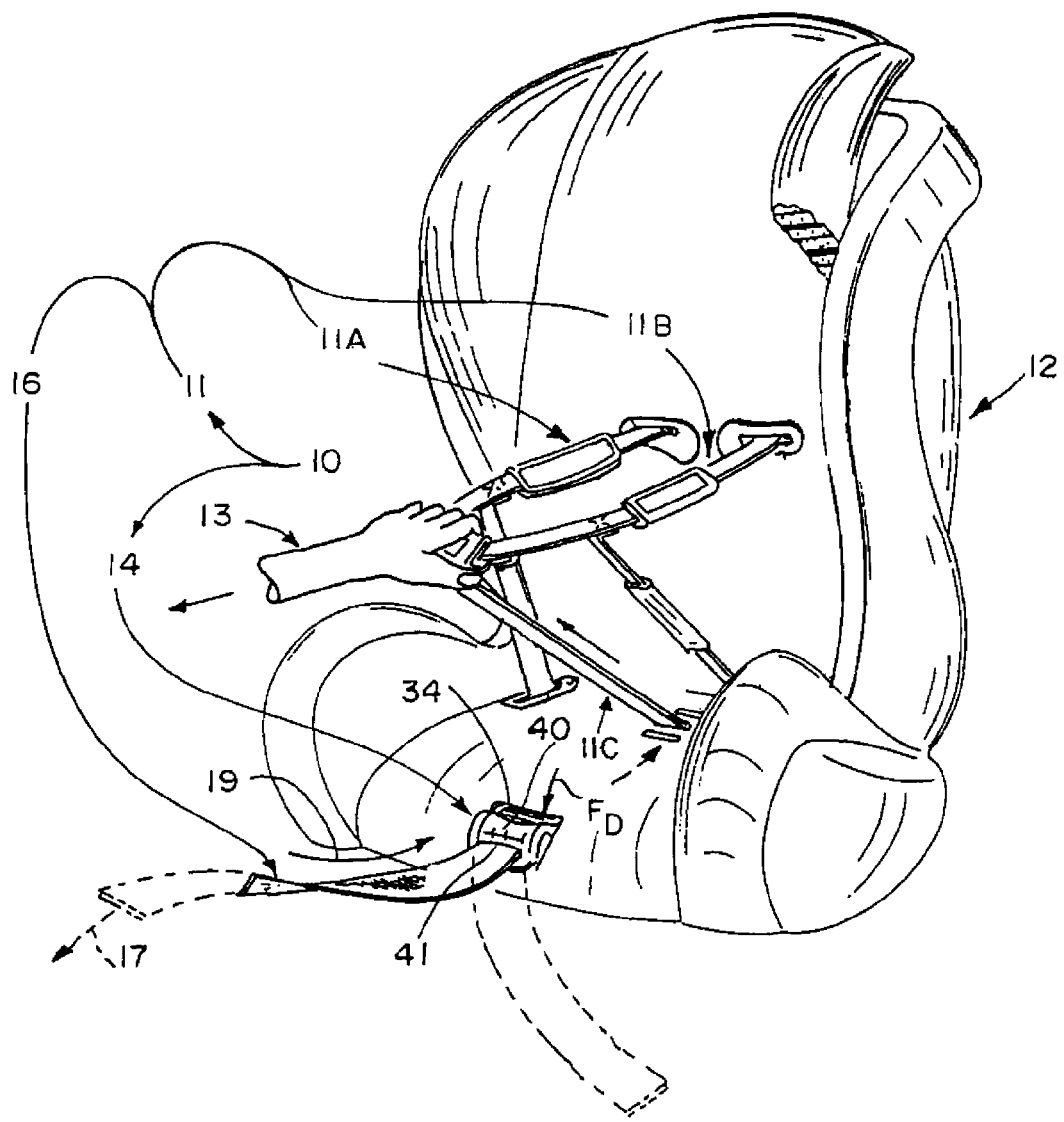
FIG. 11 is a perspective view of the juvenile seat of FIG. 1 showing a caregiver pulling on a portion of a harness included in the child-restraint system while pushing downwardly on the spring-loaded pawl to release a clamping force on the CFA webbing strip passing through the web-receiving channel formed in the sheet metal frame and the web tunnel defined by the web guide and the sheet metal frame to free the CFA webbing strip to be pulled inwardly through the narrow-width web entrance slot formed in the front wall of the web guide and through the web-receiving channel and the web during a harness-loosening activity.

Center front adjuster 14 includes a frame 20, a web clamp 30, and a web guide 40 in accordance with a first embodiment of the present disclosure as shown, for example, in FIG. 3. Web clamp 30 is configured to be coupled to frame 20 as suggested in FIGS. 3 and 4 and clamp a portion of web 16 passing under web clamp 30 as suggested in FIG. 4. Web guide 40 is formed to include a web entrance slot 42 and is coupled to frame 20 to cover a portion of web clamp 30 as suggested in FIGS. 2 and 4. A web guide 140 in accordance with a second embodiment of the present disclosure is shown, for example, in FIGS. 13-19.

Web guide 40 is configured to guide the web 16 passing through frame 20 and under web clamp 30 so that web 16 is guided through a web tunnel 18 formed in center front adjuster 14 and bounded by frame 20, web clamp 30, and web guide 40 as suggested in FIGS. 4-6. In an illustrative embodiment, web guide 40 is made of a plastics material while frame 20 is made of a sheet metal material.

Frame 20 includes a horizontal base plate 23 and upright first and second side plates 21, 22 as shown, for example in FIG. 3. Horizontal base plate 23 is formed to include a web exit slot 24 and adapted to be mounted on juvenile vehicle seat 12 as suggested in FIG. 1. Upright first and second side plates 21, 22 are coupled to horizontal base plate 23 and arranged to lie in spaced-apart relation to one another to form therebetween a web-receiving channel 25 communicating with web exit slot 24 as shown best in FIG. 3.

Horizontal base plate 23 includes a front mount flange 23F, a rear mount flange 23R, and a platform 23P arranged to interconnect front and rear mount flanges 23F, 23R and to support upright first and second upright plates 21, 22 as suggested in FIG. 3. Platform 23P is formed to include web exit slot 24. First side plate 21 of frame 20 includes a first forward-facing edge 21F arranged to face forwardly toward front mount flange 23F as suggested in FIGS. 3 and 6. Second side plate 22 of frame 20 includes a second forward-facing edge 22F arranged to face forwardly toward front mount flange 23F and lie in the same plane as first forward-facing edge 21F as suggested in FIGS. 3 and 6.

Web clamp 30 is coupled to the upright first and second side plates 21, 22 of frame 20 as suggested in FIG. 3. Web clamp 30 is configured to apply a clamping force F to a portion of web 16 extending into web tunnel 18 through a web entrance slot formed in web guide 40 to hold web 16 in a stationary position relative to frame 20 as suggested in FIG. 4. Forward-facing edges 21F, 22F of upright first and second side plates 21, 22 of frame 20 are arranged to face away from web clamp 30 as suggested in FIG. 3.

Web clamp 30 includes a web-gripping pawl 31, a pawl axle 32, and a pawl-return spring 33 in an illustrative embodiment as shown in FIGS. 3 and 4. Pawl axle 32 is mounted in aperture 32L formed in first side plate 21 of frame 20 and in aperture 32R formed in second side plate 22 of frame 20 as suggested in FIG. 3. Pawl-return spring 33 is a torsion spring mounted on pawl axle 32 and coupled to frame 20 and to web-gripping pawl 31 to provide means for yieldably urging the web-gripping pawl 31 to pivot on pawl axle 31 about a pivot axis 132 to a web-clamping position shown, for example, in FIG. 4. A caregiver can push downwardly on a lever 34 included in web-gripping pawl 31 to apply a downward force $F_D$ to pivot web-gripping pawl 31 about pivot axis 132 established by pawl axle 32 in a clockwise direction 232 (see FIG. 4) to release the clamping force on web 16 so as to allow the caregiver 13 to loosen the harness as suggested in FIG. 11.

Web guide 40 is coupled to frame 20 as suggested in FIG. 2. Web guide 40 covers a portion of web-receiving channel 25 formed in horizontal base plate 23 to form a web tunnel 18 defined by portions of horizontal base plate 23, first and second side walls 21, 22, and web guide 40 as suggested in FIGS. 3-5. Web guide 40 includes a front wall 41 arranged to cover forward-facing edges 21F, 22F of upright first and second side plates 21, 22 so that web 16 passing through center front adjuster 14 is unable to contact either one of the forward-facing edges 21F, 22F as suggested in FIG. 6. Front wall 41 is formed to include a web entrance slot 42 arranged to extend laterally between upright first and second side plates 21, 22 to provide an entry portal into web tunnel 18. The entry portal is sized to provide means for guiding any web 16 passing into web tunnel 18 through web entrance slot 42 past forward-facing edges 21F, 22F of upright first and second side plates 21, 22 and toward web exit slot 24 without contacting the forward-facing edges 21F, 22F of upright first and second side plates 21, 22 as suggested in FIGS. 4 and 6.

Web entrance slot 42 formed in front wall 41 of web guide 40 has a laterally extending width characterized by a first width dimension W1 as suggested in FIG. 6. Upright first and second side plates 21, 22 of frame 20 are separated laterally from one another by a second width dimension W2 that is greater than first width dimension W1 as also suggested in FIG. 6. Front wall 41 has a uniform thickness T as suggested in FIG. 6.

Web guide 40 includes a first side panel 43 and a second side panel 44 arranged to lie in spaced-apart relation to first side panel 43 to locate portions of upright first and second side plates 21, 22 therebetween as suggested in FIGS. 2, 3, and 6. Front wall 41 of web guide 40 is arranged to interconnect first and second side panels 43, 44 as suggested in FIGS. 2, 5, and 6.

Web guide 40 further includes a canopy 45 coupled to each of front wall 41 and first and second side panels 43, 44 as suggested in FIGS. 2 and 3. Canopy 45 is arranged to span a laterally extending space provided between first and second side panels 43, 44 to form a top boundary of web tunnel 18 and cover a portion of web clamp 30 as suggested in FIGS. 2-5.

Front wall 41 of web guide 40 includes a first (left-side) rearward-facing edge panel 41L mating with forward-facing edge 21F of upright first side plate 21 to provide first side means for blocking engagement of a web 16 extending into web tunnel 18 through web entrance slot 42 and exiting web tunnel 18 through web exit slot 24 with forward-facing edge 21F of upright first side plate 21 as suggested in FIG. 6. Front wall 41 also includes a second (right-side) rearward-facing edge panel 41R mating with forward-facing edge 22F of upright second side plate 22 to provide second side means for blocking engagement of a web 16 extending into web tunnel 18 through web entrance slot 42 and exiting web tunnel 18 through web exit slot 24 with forward-facing edge 22F of upright second side plate 22 as suggested in FIG. 6. In an illustrative embodiment, first rearward-facing edge panel 41L extends inwardly in a first direction D1 past an inner surface 21I of first side plate 21 and second rearward-facing edge panel 41R extends inwardly in an opposite second direction D2 past an inner surface 22I of second side plate 22 as shown, for example, in FIG. 6.

Web guide 40 further includes a front mount flange 40F coupled to each of front wall 41 and first and second side panels 43, 44 as suggested in FIG. 3 and mated to front mount flange 23F of horizontal base plate 23 as suggested in FIGS. 2 and 4. Fasteners F1 and F2 pass through apertures A1, A2 formed in web guide 40 and apertures A3, A4 formed in frame 20 to mate with juvenile vehicle seat 12 and hold center front adjuster 14 in a stationary position on juvenile vehicle seat 12 as suggested in FIGS. 2-4. The forward-facing edges 21F, 22F of upright first and second side plates 21, 22 of frame 20 are arranged to face toward front mount flange 23F of horizontal base plate 23 and away from platform 23P and rear mount flange 23R as suggested in FIG. 3.

Web guide 40 further includes a rear mount flange 40R coupled to first and second side panels 43, 44 and mated to rear mount flange 23R of horizontal base plate 23 as suggested in FIGS. 3 and 4. Front mount flange 40F is arranged to mate with horizontal base plate 23 and extend in a direction away from web exit slot 24 and lie outside web tunnel 18 as suggested in FIGS. 4 and 6. The forward-facing edges 21F, 22F of upright first and second side plates 21, 22 of frame 20 are arranged to face toward front mount flange 40F of web guide 30 and away from web exit slot 24 formed in horizontal base plate 23.

Front wall 41 of web guide 30 further includes a center panel 41C arranged to interconnect the first and second rearward-facing edge panels 41L and 41R. Center panel 41C is formed to include web entrance slot 42 to cause web entrance slot 42 to lie in spaced-apart relation to each of first and second rearward-facing edge panels 41L, 41R of web guide 40 and to each of forward-facing edges 21F, 22F of upright first and second plates 21, 22 of frame 20.

Figure 12:
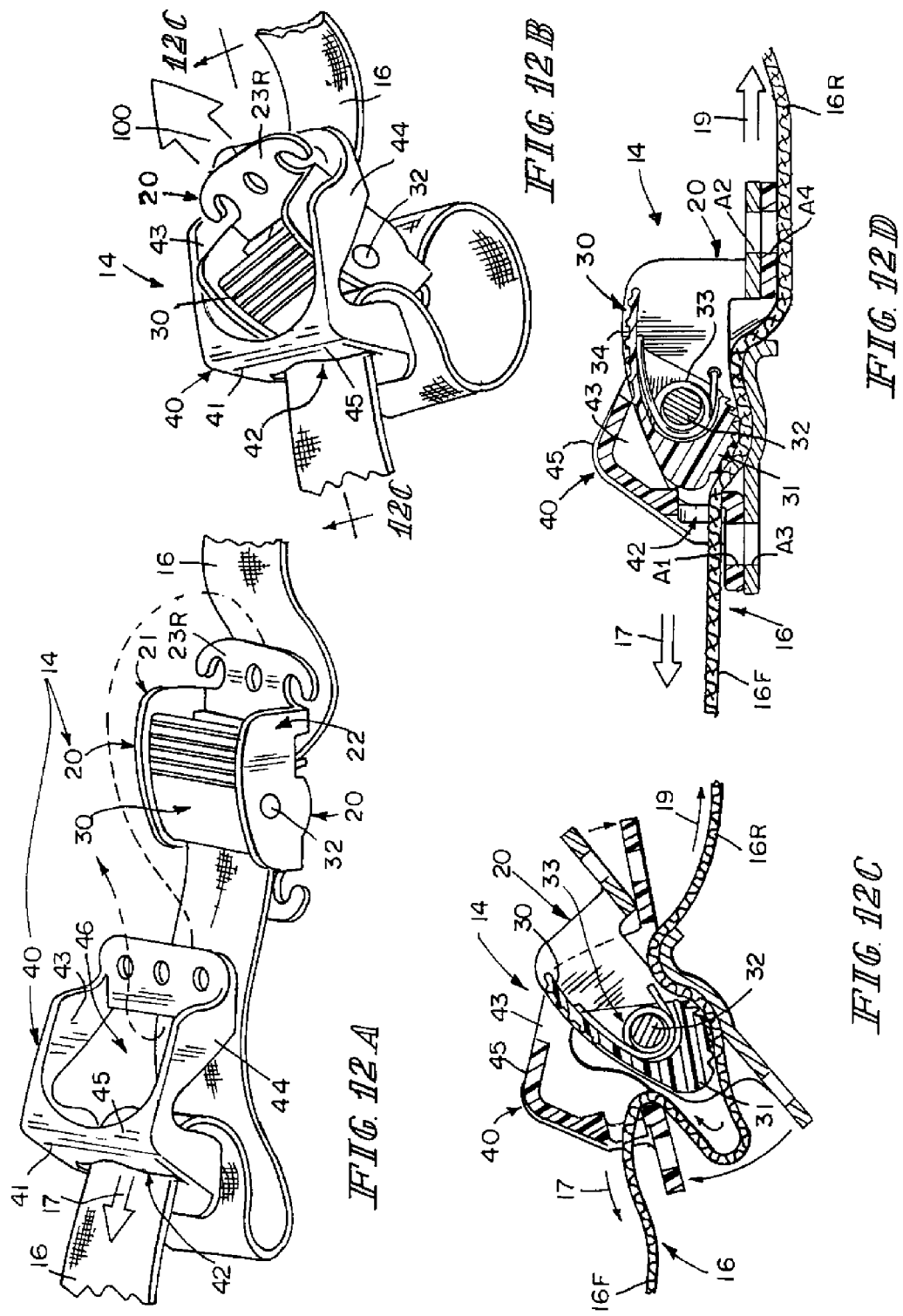
FIGS. 12A-12D are a series of perspective and sectional views showing an illustrative manner of pulling on the CFA web strip to mount the web guide on the sheet metal frame.
Figure 13:
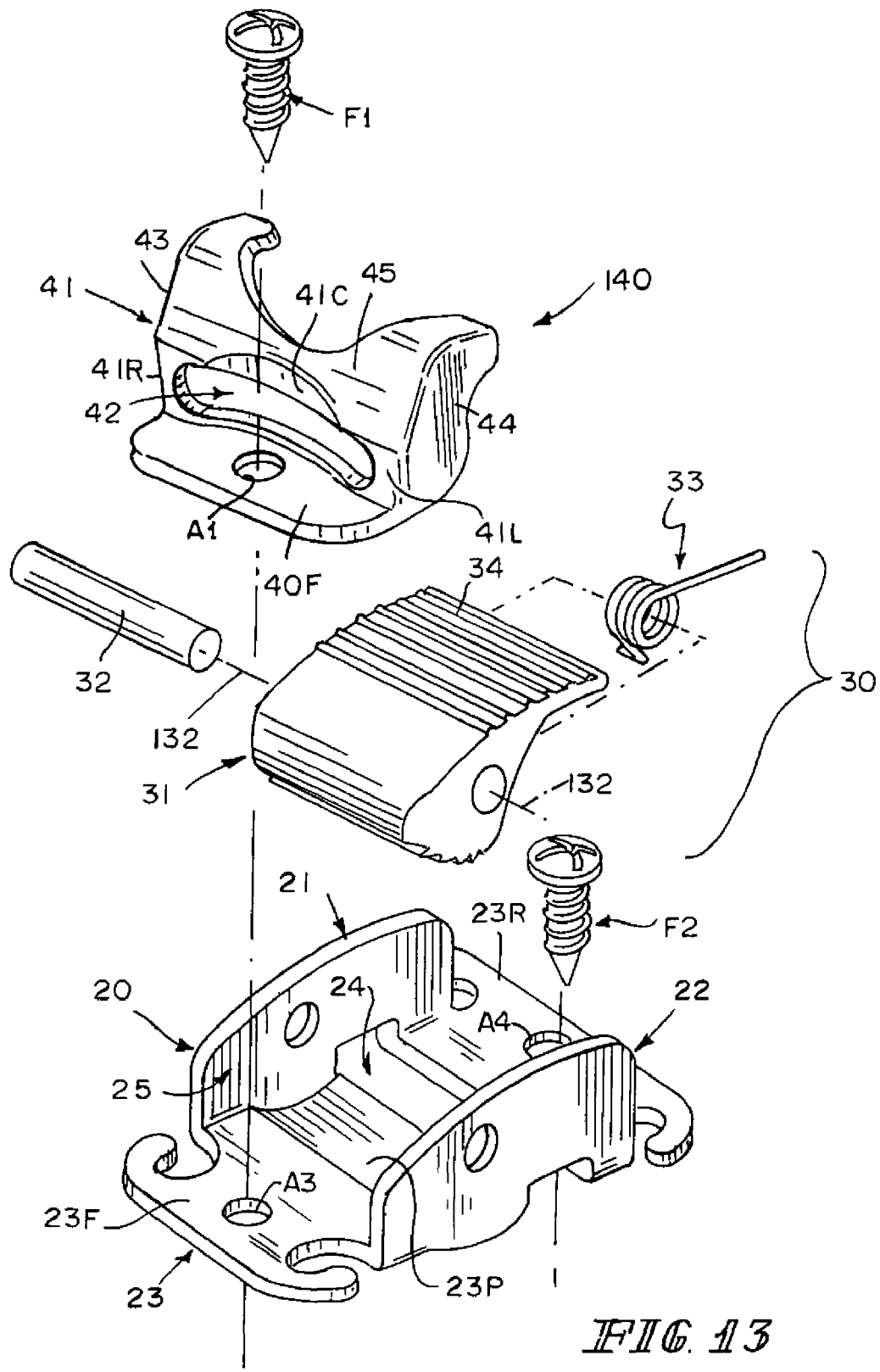
FIG. 13 is an exploded perspective assembly view of a center front adjuster in accordance with a second embodiment of the present disclosure.
Figure 14:
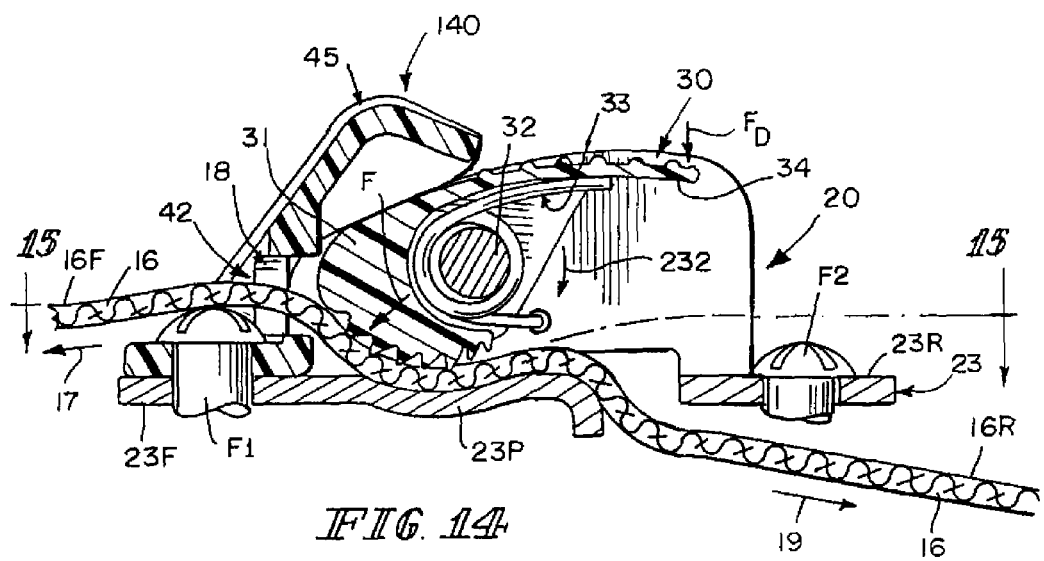
FIG. 14 is a sectional view similar to FIG. 4 showing a CFA web strip passing through the center front adjuster illustrated in FIG. 13.
Figure 15:
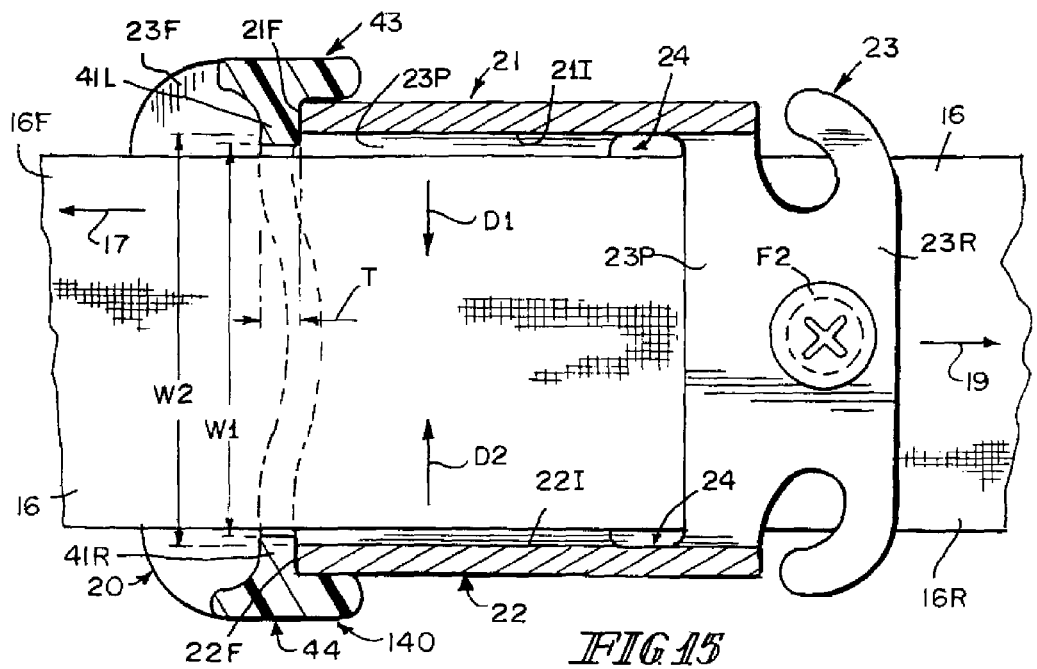
FIG. 15 is a sectional view taken along line 15-15 of FIG. 14.
Figure 16:
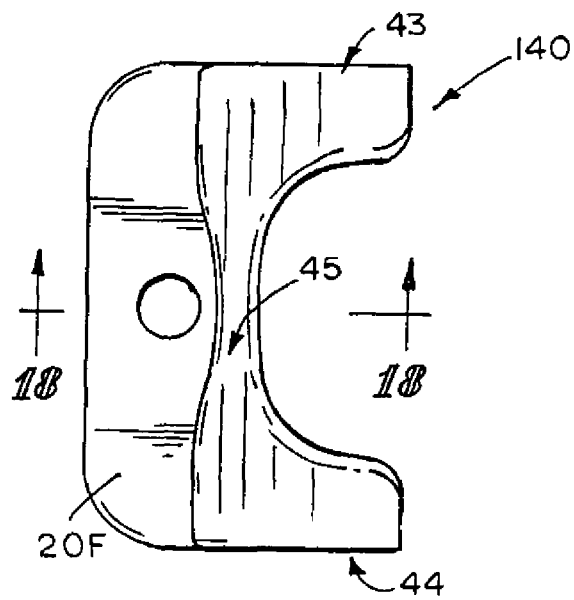
FIG. 16 is a top plan view of the web guide shown in FIGS. 13 and 14.
Figures 17, 18:
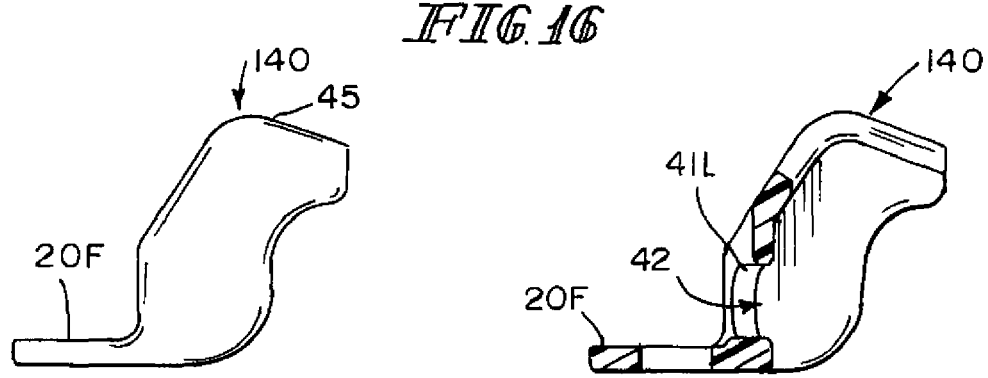
FIG. 17 is a side elevation view of the web guide of FIG. 16.
FIG. 18 is a sectional view taken along line 18-18 of FIG. 16.
Figure 19:
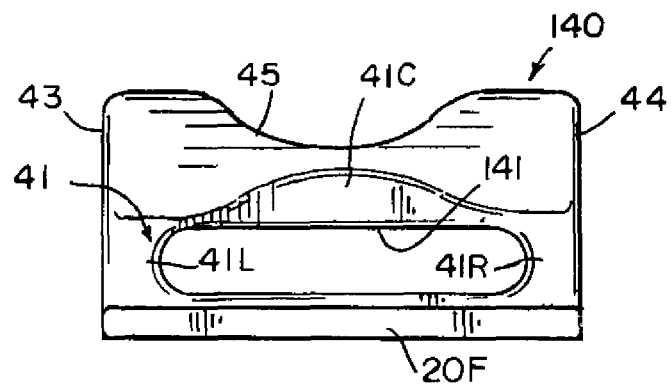
FIG. 19 is a front elevation view of the web guide of FIG. 16 showing an oblong narrow-width front slot formed therein.

Using an illustrative assembly technique shown in FIGS. 12A-12D, web 16 is threaded through web entrance slot 42 formed in web guide 40 and web exit slot 24 as suggested in FIG. 12A. The web 16 is pulled in opposite directions 17, 19 to couple web guide 40 to frame 20.

A free end of web 16 is moved to slide in outward direction 17 first through web exit slot 24 formed in frame 20 and then through web entrance slot 42 formed in web guide 30 as suggested in FIG. 12A. Then web guide 30 is moved along web 16 to lie near to frame 20. Next, rear mount flange 20R of frame 20 is pushed in direction 100 through an opening 46 formed in web guide 30 and bounded by canopy 45, first and second side panels 43, 44, and rear mount flange 40R as suggested in FIGS. 12B and 12C. The caregiver 13 then pulls a rear portion 16R of web 16 in inward direction 19 and pulls a front portion 16F of web 16 in outward direction 17 as suggested in FIG. 12D to cause web 16 to apply forces to web guide 40 to cause web guide 40 to move relative to frame 20 to snap into place as shown in FIG. 12D. This assembly can then be mounted on juvenile vehicle seat 12 using fasteners F1 and F2. In an illustrative embodiment, rear mount flange 23R of frame 20 lies above rear mount flange 40R of web guide 40 and acts as a "washer" to provide additional strength.

A web guide 140 in accordance with a second embodiment of the disclosure is shown in FIGS. 13-19. One difference between web guide 140 and web guide 40 is the omission of rear mount flange 40R included in web guide 40.

The invention claimed is:

1. A child-restraint system for a juvenile vehicle seat, the child-restraint system comprising
   a frame including a horizontal base plate formed to include a web exit slot and adapted to be mounted on the juvenile vehicle seat and upright first and second side plates coupled to the horizontal base plate and arranged to lie in spaced-apart relation to one another to form therebetween a web-receiving channel communicating with the web exit slot,
   a web guide coupled to the frame to cover a portion of the web-receiving channel formed in the horizontal base plate to form a web tunnel defined by portions of the horizontal base plate, first and second side walls, and web guide, the web guide includes a front wall arranged to cover forward-facing edges of the upright first and second side plates and formed to include a web entrance slot arranged to extend laterally between the upright first and second side plates to provide an entry portal into the web tunnel sized to provide means for guiding any web passing into the web tunnel through the web entrance slot past the forward-facing edges of the upright first and second side plates and toward the web exit slot without contacting the forward-facing edges of the upright first and second side plates, and
   a web clamp coupled to the upright first and second side plates of the frame and configured to apply a clamping force to a web extending into the web tunnel through the web entrance slot to hold the web in a stationary position relative to the frame, wherein the forward-facing edges of the upright first and second side plates of the frame are arranged to face away from the web clamp:
   wherein the web guide includes a first side panel and a second side panel arranged to lie in spaced-apart relation to the first side panel to locate portions of the upright first and second side plates therebetween;
   wherein the front wall is arranged to interconnect the first and second side panels: and
   wherein the horizontal base plate includes a front mount flange, a rear mount flange, and a platform arranged to interconnect the front and rear mount flanges and to support the first and second upright plates and formed to include the web exit slot and the web guide further includes a front mount flange coupled to each of the front wall and first and second side panels and mated to the front mount flange of the horizontal base plate.

2. The system of claim 1, wherein the web guide further includes a canopy coupled to each of the front wall and the first and second side panels and arranged to span a laterally extending space provided between the first and second side panels to form a top boundary of the web tunnel and cover a portion of the web clamp.

3. The system of claim 1, wherein the web entrance slot formed in the front wall of the web guide has a laterally extending width characterized by a first width dimension and the upright first and second side plates of the frame are separated laterally from one another by a second width dimension that is greater than the first width dimension.

4. The system of claim 1, wherein the front wall includes a first rearward-facing edge panel mating with the forward-facing edge of the upright first side plate to provide first side means for blocking engagement of a web extending into the web tunnel through the web entrance slot and exiting the web tunnel through the web exit slot with the forward-facing edge of the upright first side plate and a second rearward-facing edge panel mating with the forward-facing edge of the upright second side plate to provide second side means for blocking engagement of a web extending into the web tunnel through the web entrance slot and exiting the web tunnel through the web exit slot with the forward-facing edge of the upright second side plate.

5. The system of claim 4, wherein the upright first and second side plates of the frame are made of a metal material and the front wall of the web guide is made of a plastics material.

6. The system of claim 1, wherein the forward-facing edges of the upright first and second side plates of the frame are arranged to face toward the front mount flange of the horizontal base plate and away from the platform and the rear mount flange.

7. The system of claim 1, wherein the web guide further includes a rear mount flange coupled to the first and second side panels and mated to the rear mount flange of the horizontal base plate.

8. The system of claim 1, wherein the web guide further includes a canopy coupled to each of the first and second side panels and arranged to span a laterally extending space provided between the first and second side panels to form a top boundary of the web tunnel and cover a portion of the web clamp and the front wall is coupled to the canopy and arranged to extend downwardly toward the horizontal base plate.

9. The system of claim 8, wherein the web entrance slot formed in the front wall of the web guide has a laterally extending width characterized by a first width dimension and the upright first and second side plates of the frame are separated laterally from one another by a second width dimension that is greater than the first width dimension.

10. The system of claim 8, wherein the front wall includes a first rearward-facing edge mating with the forward-facing edge of the upright first side plate to provide first side means for blocking engagement of a web extending into the web tunnel through the web entrance slot and exiting the web tunnel through the web exit slot with the forward-facing edge of the upright first side plate and a second rearward-facing edge mating with the forward-facing edge of the upright second side plate to provide second side means for blocking engagement of a web extending into the web tunnel through the web entrance slot and exiting the web tunnel through the web exit slot with the forward-facing edge of the upright second side plate.

11. The system of claim 8, wherein the front wall is arranged to mate with the horizontal base plate.

12. The system of claim 11, wherein the web guide further includes a front mount flange coupled to the front wall and arranged to mate with the horizontal base plate and extend in a direction away from the web exit slot and lie outside the web tunnel.

13. The system of claim 12, wherein the forward-facing edges of the upright first and second side plates of the frame are arranged to face toward the front mount flange of the front wall and away from the web exit slot formed in the horizontal base plate.

14. The system of claim 1, wherein the front wall of the web guide includes a first rearward-facing edge panel mating with the forward-facing edge of the upright first side plate to provide first side means for blocking engagement of a web extending into the web tunnel through the web entrance slot and exiting the web tunnel through the web exit slot with the forward-facing edge of the upright first side plate and a second rearward-facing edge panel mating with the forward-facing edge of the upright second side plate to provide second side means for blocking engagement of a web extending into the web tunnel through the web entrance slot and exiting the web tunnel through the web exit slot with the forward-facing edge of the upright second side plate.

15. The system of claim 14, wherein the front wall of the web guide further includes a center panel arranged to interconnect the first and second rearward-facing edge panels and formed to include the web entrance slot to cause the web entrance slot to lie in spaced-apart relation to each of the first and second rearward-facing edge panels of the web guide and to each of the forward-facing edges of the upright first and second plates of the frame.

16. The system of claim 14, wherein the web entrance slot formed in the front wall of the web guide has a laterally extending width characterized by a first width dimension and the upright first and second side plates of the frame are separated laterally from one another by a second width dimension that is greater than the first width dimension.

17. The system of claim 1, wherein the web guide further includes a canopy arranged to overlie portions of the upright first and second side plates of the frame and to span a laterally extending space provided between the upright first and second side plates to form a top boundary of the web tunnel and cover a portion of the web clamp and wherein the front wall is coupled to the canopy and arranged to extend downwardly toward the horizontal base plate to locate the web entrance slot above the horizontal base plate and below the canopy.

18. The system of claim 17, wherein the web entrance slot formed in the front wall of the web guide has a laterally extending width characterized by a first width dimension and the upright first and second side plates of the frame are separated laterally from one another by a second width dimension that is greater than the first width dimension.

19. The system of claim 18, wherein the front wall includes a first rearward-facing edge mating with the forward-facing edge of the upright first side plate to provide first side means for blocking engagement of a web extending into the web tunnel through the web entrance slot and exiting the web tunnel through the web exit slot with the forward-facing edge of the upright first side plate and a second rearward-facing edge mating with the forward-facing edge of the upright second side plate to provide second side means for blocking engagement of a web extending into the web tunnel through the web entrance slot and exiting the web tunnel through the web exit slot with the forward-facing edge of the upright second side plate.

20. The system of claim 18, wherein the front wall is arranged to mate with the horizontal base plate.

21. The system of claim 20, wherein the web guide further includes a front mount flange coupled to the front wall and arranged to mate with the horizontal base plate and extend in a direction away from the web exit slot and lie outside the web tunnel.

22. The system of claim 21, wherein the forward-facing edges of the upright first and second side plates of the frame are arranged to face toward the front mount flange of the front wall and away from the web exit slot formed in the horizontal base plate.

23. A child-restraint system for a juvenile vehicle seat, the child-restraint system comprising
a frame including a horizontal base plate formed to include a web exit slot and adapted to be mounted on the juvenile vehicle seat and upright first and second side plates coupled to the horizontal base plate and arranged to lie in spaced-apart relation to one another to form therebetween a web-receiving channel communicating with the web exit slot, a web guide coupled to the frame to cover a portion of the web-receiving channel formed in the horizontal base plate to form a web tunnel defined by portions of the horizontal base plate, first and second side walls, and web guide, the web guide includes a front wall arranged to cover forward-facing edges of the upright first and second side plates and formed to include a web entrance slot arranged to extend laterally between the upright first and second side plates to provide an entry portal into the web tunnel sized to provide means for guiding any web passing into the web tunnel through the web entrance slot past the forward-facing edges of the upright first and second side plates and toward the web exit slot without contacting the forward-facing edges of the upright first and second side plates, and a web clamp coupled to the upright first and second side plates of the frame and configured to apply a clamping force to a web extending into the web tunnel through the web entrance slot to hold the web in a stationary position relative to the frame, wherein the forward-facing edges of the upright first and second side plates of the frame are arranged to face away from the web clamp;

wherein the front wall of the web guide includes a first rearward-facing edge panel mating with the forward-facing edge of the upright first side plate to provide first side means for blocking engagement of a web extending into the web tunnel through the web entrance slot and exiting the web tunnel through the web exit slot with the forward-facing edge of the upright first side plate and a second rearward-facing edge panel mating with the forward-facing edge of the upright second side plate to provide second side means for blocking engagement of a web extending into the web tunnel through the web entrance slot and exiting the web tunnel through the web exit slot with the forward-facing edge of the upright second side plate; and wherein the horizontal base plate includes a front mount flange, a rear mount flange, and a platform arranged to interconnect the front and rear mount flanges and to support the first and second upright plates and formed to include the web exit slot and the web guide further includes a front mount flange coupled to each of the front wall and first and second side panels and mated to the front mount flange of the horizontal base plate.

24. The system of claim 23, wherein the forward-facing edges of the upright first and second side plates of the frame are arranged to face toward the front mount flange of the horizontal base plate and away from the platform and the rear mount flange.

25. The system of claim 23, wherein the web guide further includes a rear mount flange coupled to the first and second side panels and mated to the rear mount flange of the horizontal base plate.

26. A child-restraint system for a juvenile vehicle seat, the child-restraint system comprising a frame including a horizontal base plate including a front mount flange at one end, a rear mount flange at an opposite end, and a platform arranged to interconnect the front and rear mount flanges, the frame further including a first side plate coupled to the platform and formed to include a first forward-facing edge facing toward the front mount flange and away from the rear mount flange and a second side plate coupled to the platform to lie in laterally spaced-apart relation to the first side plate to form a web-receiving channel therebetween and formed to include a second forward-facing edge facing toward the first mount flange and away from the rear mount flange, a web clamp coupled to the first and second side plates of the frame and configured to lie above and apply a clamping force to a web passing over the platform and through the web-receiving channel, and a web guide made of a plastics material and coupled to the frame and configured to include a first rearward-facing edge panel covering the first forward-facing edge, a second rearward-facing edge panel covering the second forward-facing edge, and a center panel arranged to lie between the first and second rearward-facing edge panels, wherein the center panel is formed to include a web entrance slot opening into the web-receiving channel to receive a web passing into the web-receiving channel, over the platform, and under the web clamp.

27. The system of claim 26, wherein the web entrance slot formed in the web guide has a laterally extending width characterized by a first width dimension and the first and second side plates of the frame are separated laterally from one another by a second width dimension that is greater than the first width dimension.

28. The system of claim 26, wherein the web guide further includes a canopy coupled to each of the first and second side panels and arranged to span a laterally extending space provided between the first and second side panels to form a top boundary of the web tunnel and cover a portion of the web clamp and the center panel is coupled to the canopy and arranged to extend downwardly toward the horizontal base plate.

29. The system of claim 26, wherein the web guide further includes a rear mount flange coupled to the first and second side panels and mated to the rear mount flange of the horizontal base plate.

* * * * *